May 30, 1961  J. B. JONES ET AL  2,985,954
METHOD AND APPARATUS EMPLOYING VIBRATORY
ENERGY FOR BONDING METALS
Filed Sept. 5, 1956  2 Sheets-Sheet 1

INVENTORS
JAMES BYRON JONES
WILLIAM C. ELMORE
CARMINE F. DE PRISCO
BY  Arthur H. Seidel
ATTORNEY

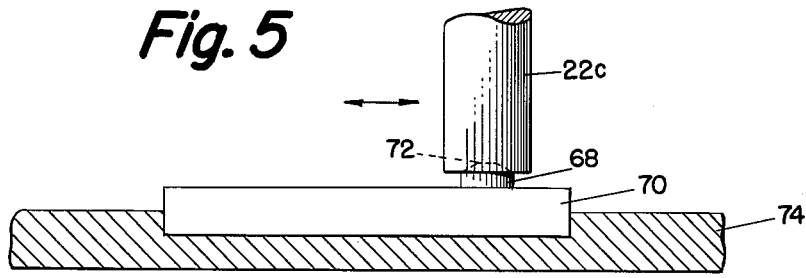
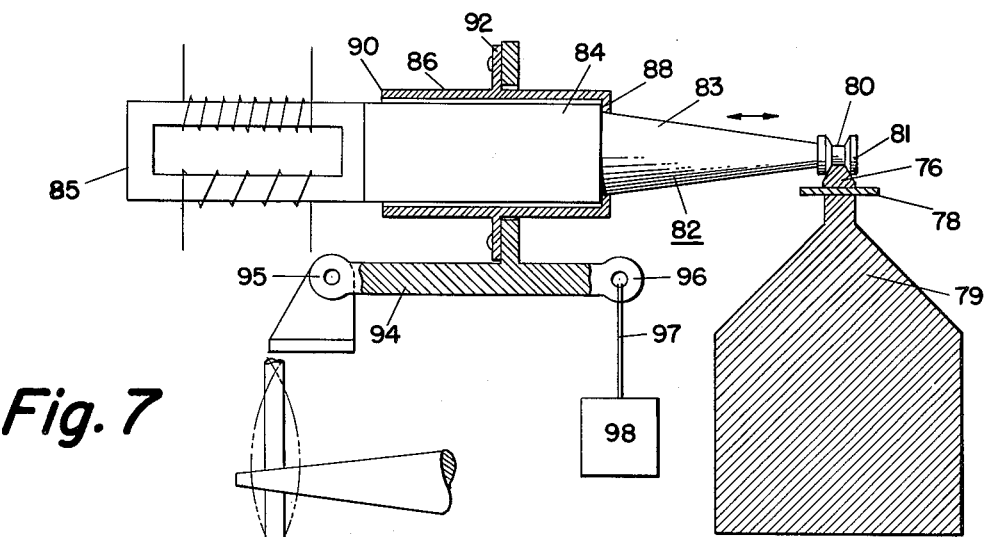
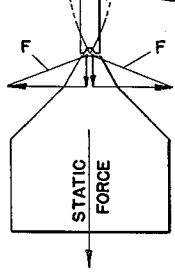

United States Patent Office 2,985,954
Patented May 30, 1961

2,985,954
METHOD AND APPARATUS EMPLOYING VIBRATORY ENERGY FOR BONDING METALS

James Byron Jones, Carmine F. De Prisco, and William C. Elmore, West Chester, Pa., assignors, by mesne assignments, to the United States of America as represented by the United States Atomic Energy Commission Filed Sept. 5, 1956, Ser. No. 610,991
(Filed under Rule 47(a) and 35 U.S.C. 116)
9 Claims. (Cl. 29—470)

The present invention relates to a method and apparatus employing vibratory energy for bonding metals, and to apparatus for effecting the bonding of metal members through the application of vibratory energy. The subject invention has particular utility where the metal members to be welded are shaped in a form permitting or necessitating positive coupling thereto in order to achieve improved weldments in which such metal members are in regulated alignment. Thus, the subject invention is of especial utility for the welding of metal members having converging sides, such as tapered members, sculptured, conoidal, arcuate sided members and the like, where frictional engagement on the surface opposite the surface undergoing welding is not practicable. In particular, the subject invention is of utility to the welding of a solid having converging sides for a significant portion of its outer surface and whose cross-sectional area diminishes adjacent to the perpendicular to the tangent to the surface undergoing welding for a significant portion of the length of said perpendicular. The welding process of the present invention may be accomplished with or without the independent application of heat, and the apparatus of the present invention may include means for furnishing heat to the metals being bonded.

In our earlier applications, namely our patent applications Serial No. 467,382 filed November 8, 1954 for "Method And Apparatus Employing Vibratory Energy For Bonding Materials," now abandoned; Serial No. 579,780 filed April 23, 1956, now Patent 2,946,119, for "Method And Apparatus Employing Vibratory Energy For Bonding Metals"; and Serial No. 579,779 filed April 23, 1956, now abandoned, for "Vibratory Seam And Vibratory Seam Welding Process," of each of which this application is a continuation-in-part, we have disclosed apparatus for and a method of bonding metals together in which contacting surfaces of the metals to be bonded are held under sufficient force to hold them together in firm contact at the intended weld interface and while the metals are so-retained, elastic vibration [1] is applied to the weldment through a friction coupling so as to produce either shear vibration or a combination of shear and compressive vibration at the interface being bonded.

When it is desirable to weld together metal members which are in a form difficult to retain in vibratory welding disposition by means of friction, as for example the welding together of wire members, such as grid or mesh type baskets from aluminum wire, or the welding together of wire members to form electrical contacts, or in some types of structural elements having a grid design, ordinary methods of joining, such as resistance welding, may be unsatisfactory because of an unsatisfactory appearance resulting from spattering and because the welds are apt to be erratic. The use of techniques involving crimping the wires together to avoid the necessity of welding is also sometimes unsatisfactory because of relatively low mechanical strengths produced by these techniques. Furthermore, the aforesaid type welding is not especially amenable to fabrication with vibratory welding of the types disclosed in our copending applications above referred to, because the elastic vibratory energy is introduced into the weldment by means of a frictional coupling, e.g. the components of the weldment are pressed together and, being of a form such as round wires which are inclined to slip and become misaligned, the frictional type coupling described in these applications is not particularly suitable.

When it is desirable to weld together such metal members, which are in a form difficult to retain in vibratory welding disposition by means of friction as described in the examples mentioned, the welding may be more readily accomplished and somewhat superior bonds may be produced when the elastic energy is introduced into at least one of the members of the weldment through a sonotrode tip which mates with and positively engages one of the weldment members in accordance with the process of the present invention.

Similar problems as to the grasping and retention of metal members undergoing vibratory welding may be encountered due to the exposed surface geometry of the weldment members being unsuited to being contacted by the jaws of the ultrasonic welding array described in the applications mentioned above, as in the welding of tapered button-to-sheet or plate or ribbon configurations, the laying down of switch contacts, the welding of metal flange or rib members to the outer surface of metal rod or tubing or plate, and other forms of weldments where close alignment of the component elements of the weldment should be observed, and especially where the component elements undergoing welding are of irregular, angular or arcuate shape.

This invention has as an object the provision of a novel vibratory welding method.

This invention has as a different object the provision of a method for forming welds in metal members, at least one of which has converging sides, through the application of vibratory energy.

This invention has as another object the provision of a method for welding together a plurality of metal members through the application of vibratory energy by positively holding the metal members undergoing welding in position during the welding process.

This invention has as yet another object the provision of a method for forming welds between metal members which cannot be readily held in position by the application of clamping forces on the surfaces thereof remote from the interface undergoing welding.

This invention has as a still further object the provision of novel welding apparatus.

This invention has as a yet further object the provision of apparatus for vibratorily welding metal members together whose shape does not readily permit the application of static clamping forces.

This invention has as a still further object the provision of apparatus for vibratorily welding metal members together, in which at least one of the metal members is substantially positively held during welding.

This invention has as still another object the provision of apparatus for vibratorily welding metal members together, in which a plurality of metal members are substantially positively driven during welding.

Other objects will appear hereafter.

The process of the present invention differs from the process disclosed in our copending patent applications

---

[1] By "elastic" as used herein is meant that the vibration is applied to the weldment by means of an elastic member, such as a metal rod.

Serial Nos. 467,382; 579,779 and 579,780 which disclose vibratory welding processes in which the component elements undergoing welding are welded together by elastic vibration applied to the weldment through a friction coupling so as to produce shear vibration or a combination of shear vibration and compressive vibration at the interface being bonded, with the workpieces being retained in operative disposition during welding by the frictional coupling between the support and its adjoining workpiece and the sonotrode and its adjoining workpiece.

In the subject invention we substantially positively engage the sonotrode and its adjoining workpiece, or in another embodiment we substantially positively engage both the sonotrode and its adjoining workpiece and the support and its adjoining workpiece. By "substantially positively engage" as used herein is meant the nesting or other interlocking between the sonotrode and its adjoining workpiece (and/or support where both the sonotrode and support engage their adjoining workpieces), without metallurgical or adhesive joining of the sonotrode and/or support to the workpieces undergoing welding. Thus, the subject invention contemplates the nesting or interlocking of the workpiece to the sonotrode (and/or support where both the sonotrode and support engage their adjoining workpieces); but with such grasping being such that there is substantially no play between the sonotrode (and/or support where both the sonotrode and support engage their adjoining workpieces) and its adjoining workpiece.

At the present time we are unable to completely explain the mechanism of the welding process of the present invention. Thus, it is our present belief that vibratory welding of the type disclosed in our copending patent applications Serial Nos. 467,382; 579,779 and 579,780, is dependent upon a static force to retain the weldment components in regulated alignment onto which is superimposed elastic vibration applied to the weldment so as to produce shear vibration or a combination of shear and compressive vibration at the interface being bonded. The force components involved in the subject welding process are frequently most complicated, particularly in the case of weldments involving irregularly shaped component elements, and the resolution of the various elastic vibratory vectors into individual component vectors is not always straightforward.

The apparatus of the present invention comprises means for effecting vibratory welding and includes a transducer. A wide variety of useful transducers are known to those skilled in this art, a preferred embodiment consisting of a magnetostrictive metal, such as nickel, the alloy 2-V Permendur (an iron-cobalt alloy), a nickel-iron alloy, or Alfenol (an aluminum-iron alloy), properly dimensioned to insure axial resonance with the frequency of the alternating current applied thereto, so as to cause it to decrease or increase in length according to its coefficient of magnetostriction. Transducers of the aforesaid type constitute a preferred embodiment for operation at frequencies of up to about 75,000 cycles per second. In place of the aforesaid metallic magnetostrictive materials, the transducer may comprise almost any material which has good physical properties and which changes its physical dimensions under the influence of an electric potential. Thus, it may comprise a piezoelectric ceramic, such as barium titanate, or lead zirconate, or a natural piezoelectric material, such as quartz crystals. Such materials are preferably used at high frequency operations, as at frequencies above about 75,000 cycles per second. The transducer may also consist of ferroelectric materials or an electromagnetic device, such as that which actuates a radio loudspeaker.

In addition to the transducer, the welding apparatus of the present invention includes a coupling system for conducting the vibratory energy from the transducer to the metals being welded. The coupling system preferably should resonate at the transducer's operating frequency and should be insensitive to applied forces, so that the welding apparatus may operate efficiently under the welding process conditions and dispense vibratory energy via the vibrating jaw which engages the metals being welded without adverse effect upon the transducer-coupling system, such as stalling, or damping, or shifting of the resonant frequency of the transducer-coupling system. In addition, in the preferred embodiment of the apparatus of the present invention, only a minor amount of energy is lost to the transducer-coupling mounting system, and the delivered vibratory energy from the welding apparatus is generally localized in the weld zone.

The vibration jaw or sonotrode of the welding apparatus of the present invention is provided with a sculptured end which may comprise a tip such as a slotted tip or a hollow conical tip into which the workpiece which faces the sonotrode may be nested or retained during welding, or a wedge or pointed cone or the like which fits into the workpiece. The support, or anvil, may also be grooved or notched or contoured, or comprise a multijaw chuck, so as to grasp or be engaged by its facing component element prior to and during welding. In cases where a fin, flange, rib or other element is welded to a flat or tubular or circular member or any restrainable member such as a box having a cavity, the support may comprise means passing within the cavity of the member. It is essential that the elements forming the workpieces protrude from the grooves or notches within the sonotrode and support (if the support is notched) sufficiently so that the workpieces and not the tips are welded together.

The welding process of the present invention is effected under a clamping force sufficient to hold the metals being welded in firm contact at the intended weld interface.

The clamping force may thus be varied over a very wide range. Thus, in a preferred embodiment of the present invention, the maximum clamping forces need not produce an external deformation [2] of more than about 10% in weldments effected at room or ambient temperatures. In many cases the extent of deformation is appreciably below 10% and in some instances may be virtually absent altogether. The minimal clamping force to be used in the process of our invention constitutes a force sufficient to maintain the metals being welded in regulated alignment and firm contact, e.g. contacting each other so that the weld may be effected by the application of vibratory energy.

The range of operative clamping pressures which may be employed in the process of the present invention may be readily ascertained by the user of the process. In all cases the clamping force must be sufficient to effect coupling between the metals being welded and the source of vibratory energy, so that such vibratory energy may be transmitted to the metals.

Inasmuch as at least one of the workpieces is mechanically engaged during welding, and in the embodiment wherein both the sonotrode and the support are notched or contoured both of the workpieces are engaged during welding, the extent of deformation of the workpieces is materially lessened, and in many cases virtually eliminated, because of the restraint of the workpieces.

The operative range of vibratory welding frequencies which may be used in the process of our invention includes frequencies within the range 59 to 300,000 cycles per second, with the preferred range constituting 400 to 75,000 cycles per second, and the optimum operating frequency range lying between about 5,000 and 40,000 cycles per second. This optimum range of operating frequencies may be readily achieved by transducer elements of known design, which are capable of generating elastic vibratory energy of high intensity.

Welding in accordance with the process of our invention may be and in many instances is initiated at room temperatures or ambient temperatures without the appli-

---

[2] By deformation is meant the change in dimensions of the weldment adjacent the weld zone divided by the aggregate thickness of the weldment members prior to welding; result multiplied by 100 to obtain percentage.

cation of heat.[3] If desired, welding in accordance with the process of our invention may also be initiated at elevated temperatures below the fusion temperature (melting point or solidus temperature of any of the pieces being bonded).[4] Thus, heating the metals to be welded prior to, and/or during welding to a temperature below their fusion temperature may, in some cases, facilitate the ease of welding and lower the power requirements and/or time requisite to achieve welding. The welding process of our invention is applicable to forming both spot and seam welds.

The welding process of our invention may be applied to a wide variety of metals, examples of which include: pure aluminum to pure aluminum; aluminum alloy to aluminum alloy; copper to copper; brass to brass; magnesium alloy to magnesium alloy; nickel to nickel; stainless steel to stainless steel; silver-titanium alloy to silver-titanium alloy; gold-platinum alloy to stainless steel; platinum to copper; platinum to stainless steel; gold-platinum alloy to nickel; titanium alloy to titanium alloy; molybdenum to molybdenum; aluminum to nickel; stainless steel to copper alloy; nickel to copper alloy; nickel alloy to nickel alloy; sintered aluminum powder to sintered aluminum powder[5]; etc.

The spot-type welding process embodiment of the present invention may be accomplished within a wide time range, such as a time range of between about 0.001 second to above 6.0 seconds, or somewhat more, with welding under most normal conditions being effected during a time interval of from several hundredths of a second to several seconds.

The welding of most metals can be effected in accordance with the process of our invention in the ambient atmosphere. However, the process of our invention comprehends welding in highly evacuated atmospheres, or in selected atmospheres, such as atmospheres comprising an inert gas. Furthermore, while the welding process of our invention may be effected with metals, such as aluminum, without the extensive precleaning required to effect satisfactory welding by other methods, a degree of precleaning and surface treatment may prove advantageous in the welding of many metals. It is desirable prior to effecting welding in accordance with the present invention to remove surface contaminants, such as hydrocarbon or other lubricants and the like.

For the purpose of illustrating the invention there are shown in the drawings forms which are presently preferred; it being understood, however, that this invention is not limited to the precise arrangements and instrumentalities shown.

Figure 5 is a sectional view showing the welding of a metal button to a metal tab.

Figure 6 is a sectional view of another embodiment of the present invention.

Figure 7 is a fragmentary elevational view of a welding apparatus embodiment of the present invention showing the combined axial-lateral vibratory motion of the jaw member.

Figure 1:
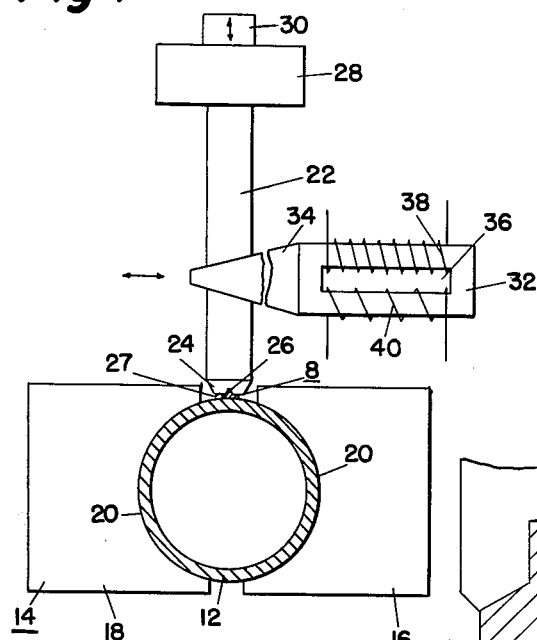
Figure 1 is a vertical sectional view of one embodiment of the present invention, revealing the welding of a rib to a tube.

Referring to the drawings, and initially to Figure 1 there is shown therein the welding of a metal rib 8 having its upper section beveled to form the portion 9, and a basal flat flange portion 10 to a tube 12. The rib 8 and the tube 12 may be formed of the same or dissimilar metals, and the rib or tube may comprise for example steel, aluminum, nickel, copper, titanium, molybdenum, etc. (by "metals," as used herein, is meant to include both metallic elements such as copper, and metallic alloys such as steel). The tube 12 is supported and retained in disposition for welding by means of the split massive support designated 14. Support 14 includes a pair of vise members 16 and 18, with each vise member having a semicircular or arcuate retention surface 20 for engaging the tube 12. Vise members 16 and 18 grasp the tube 12 from opposite sides and when engaged with tube 12 retain tube 12 in non-rotatory position. Vise members 16 and 18 are cut away to form a relatively large space therebetween on the upper surface of tube 12. The relatively large space between the elements 16 and 18 on the upper surface of tube 12 permits the rib 8 to be positioned upon tube 12 and retained thereon by sonotrode 22 whose tip 24 is notched at 26 to matingly receive the beveled portion 9 of rib 8. The positive engagement between sonotrode 22 and rib 8 is primarily on the angularly disposed sides of beveled portion 9.

The sonotrode 22 in the embodiment of the present invention shown in Figure 1 comprises a cylindrical rod which is an acoustical reed of metal and which is restrained and supported cantilever-like by the mass 28 on the upper end thereof. The force necessary to maintain the components of the weldment 12 and 8 in regulated alignment and firm contact may be supplied by suitable mechanical means which may consist of spring means, compressed air cylinder means, hydraulic cylinder means, and the like.

The reed-like sonotrode 22 is vibrated in flexure by means of the transducer 32 and the coupling member 34, which may comprise a tapered metallic element brazed, soldered or welded or otherwise secured to transducer 32 and which can encircle and be joined to an intermediate portion of sonotrode 22, being welded or brazed thereto.

The transducer 32 comprises a laminated core of nickel or other magnetostrictive metallic material, and may have a rectangularly-shaped opening 36 in its center portion. A polarizing coil 38 and an excitation coil 40 may be wound through the opening 36 within transducer 32. Upon variations of the magnetic field strength of the excitation coil 40, there will be produced concomitant variations in the dimension of the transducer 32, provided the polarizing coil 38 is charged at a suitable level with D.C. current, and that the frequency of the aforesaid variations, namely the expansion and/or contraction of the magnetostrictive transducer 32 will be approximately equal to the frequency of the alternating electric current flowing in excitation coil 40.

In place of the transducer 32 shown in the drawings, other magnetostrictive materials such as those heretofore mentioned may be used, such materials being cut to physical dimensions which minimize electrical losses and insure axial resonance at the applied alternating current frequency. In place of a magnetostrictive transducer, other transducer means for producing elastic vibratory energy may be substituted, as for example piezoceramic transducers, such as barium titanate, lead titanate-lead zirconate, etc. may be used, or a natural piezoelectric material, such as quartz crystals, may be used. The last-mentioned materials are preferably used at high frequency operations, as at frequencies above

---

[3] The weldment may be warm to the touch after the weld due to the application of the elastic vibratory energy.
[4] The temperatures to which the foregoing statements refer are those which can be measured by burying diminutive thermocouples in the weld zone prior to welding, as well as the temperatures which can be estimated or approximated from a metallographic examination of a cross-section of a vibratory weld in the ordinary magnification range up to about 500 diameters.
[5] A mixture consisting of elemental aluminum and aluminum oxide.

about 75,000 cycles per second. Transducer means consisting of an electromagnetic device, such as that which actuates a radio loudspeaker, may also be used.

In operation, the transducer 32 vibrates coupling 34 which in turn vibrates the sonotrode 22 in the path indicated by the lower double-headed arrow in Figure 1. The vibratory movement of sonotrode 22 in flexure in the indicated direction effects welding between the underside of basal flange 10 of rib 8 to the upper surface of tube 12.

Figure 2:
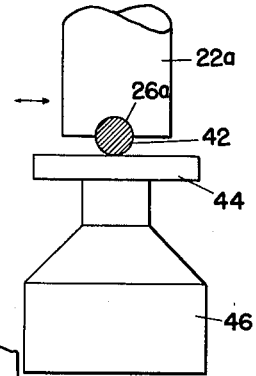
Figure 2 is a fragmentary sectional view of another embodiment of the present invention, revealing the welding of a cylindrical wire member to a flat plate.
Figure 1A:
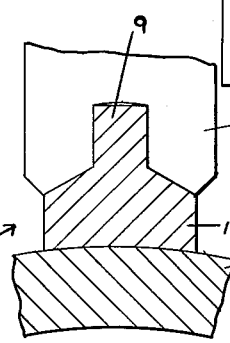
Figure 1a is a fragmentary enlarged sectional view of the rib undergoing welding.

In the embodiment of the present invention shown in Figure 2 a metal wire 42, such as an aluminum wire is welded to the upper surface of a metal plate 44.[6] In this embodiment, the sonotrode 22a generally resembles the sonotrode 22 for the embodiment shown in Figure 1, except that the underside of sonotrode 22a is provided with a semicircular concavity 26a which very tightly fits the wire in place of the notch 26 of sonotrode 22.

As will be apparent from Figure 2, no portion of the sonotrode 22a is engaged with the metal plate 44, its sole engagement being with wire 42.

In the embodiment of the present invention shown in Figure 2, the metal plate is supported upon a reflector anvil 46, with the underside of the metal plate 44 being frictionally engaged with the upper surface of anvil 46 due to the downward axial static force exerted by the means 30. Therefore, unlike the embodiment of the present invention, shown in Figure 1, there is positive engagement with but one of the metal members undergoing welding, namely, the workpiece 42 which faces the sonotrode and which is engaged therewith. Thus, as heretofore noted, the present invention contemplates the substantial positive engagement between the sonotrode and its facing workpiece, and also the restraint of the opposite member of the weldment as is exemplified by the tube 20 in the jaws 16 and 18 of Figure 1. The other workpiece may be substantially positively engaged with the support as in the embodiment shown in Figure 1; or may be frictionally engaged with the support, as in the embodiment shown in Figure 2.

The welding of wire 42 to plate 44 is accomplished by the elastic vibration applied thereto as shear vibration or a combination of shear and compressive vibration at the interface being bonded (see the path indicated by the double-headed arrow). The vibratory movement of the sonotrode 22a may be accomplished by the same transducer and coupling arrangement shown in Figure 1.

Figure 4:
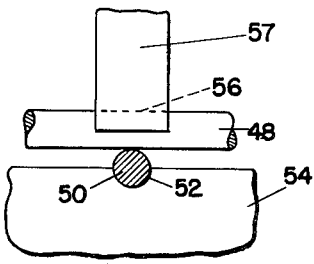
Figure 4 is a fragmentary sectional view of the embodiment of the present invention shown in Figure 3 revealing the action of one of the sonotrodes shown in Figure 3.
Figure 3:
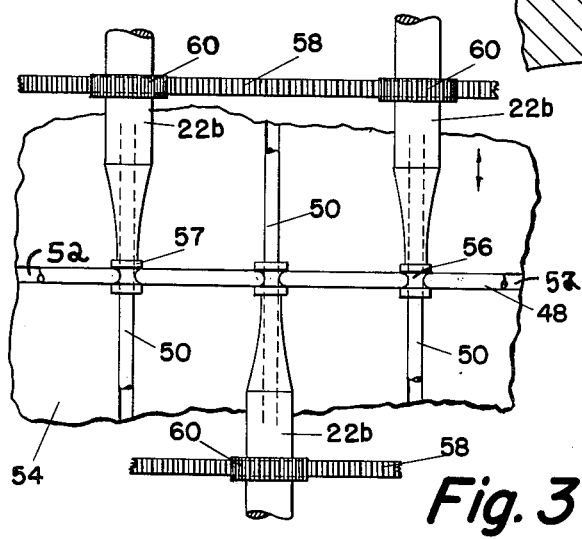
Figure 3 is a diagrammatic plan view from above of another embodiment of the present invention revealing the welding of wire mesh.

In the embodiment of the present invention shown in Figures 3 and 4, there is diagrammatically illustrated the welding of wire mesh, as for example the welding of aluminum wire mesh. In this embodiment the warp wires 48 are welded to the weft wires 50. Each of the weft wires 50 is retained in one of a series of parallel tightly-fitting concavities 52 in the upper surface of platen 54. The warp wires 48 are positioned above the weft wires 50, within an annular groove 56 in the enlarged end 57 of each sonotrode 22b and three weft wires 50 are simultaneously welded to the same warp wire 48 by means of three rotatable sonotrodes, each designated 22b. In operative disposition the end 57 is maintained horizontal in use. For the sake of simplicity, the transducers for the sonotrodes 22b are not shown in Figures 3 or 4. However, such transducers may comprise magnetostrictive transducers mounted in end to end contact with each of the sonotrodes 22b, whereby such sonotrodes 22b are imparted movement in the direction of the double headed arrow shown in Figure 3. The rotative electrical connection of sonotrodes 22b for the transducers may be effected through the use of slip rings. A specimen of such a transducer is shown in our application Serial No. 579,779 above-referred to, and the rotative electrical connections may be modified in the manner shown in said patent application.

Sonotrodes 22b may be rotated in unison by racks 58 which mesh with spur gears 60 carried by sonotrode 22b.

In the illustrated embodiment three sonotrodes 22b are shown. Each one may be used to effect a weld simultaneously, and then all three rotated or slipped atop warp wire 48 three welded positions over, such as to the right; and the welding of the wires 48 and 50 repeated.

In the embodiment of the present invention shown in Figure 5, a cylindrical button 68 having a frustroconical or truncated spheroidal upper portion is welded to a flat tab 70. The beveled upper end portion of cylindrical button 68 is retained within a socket 72 in sonotrode 22c. The socket 72 has a contour mating with the beveled portion of button 68, and substantially positively engages the button 68. The tab 70 may be retained in position within a cradle 74.

The vibration of sonotrode 22c responsive to its transducer and coupling (the transducer and coupling are not shown in the drawings, as they may be identical to those used in the embodiment of Figure 1) is in the path indicated by the double-headed arrow and effects the welding of the button 68 to the tab 70.

In the embodiment of the present invention shown in Figure 6, a beveled metal strip 76 is welded to flat metal sheet 78 which is supported on reflector anvil 79. The metal strip 76 is retained within a groove 80 of the tip 81 of the sonotrode 82. The sonotrode 82 may comprise a tapered portion 83 and a cylindrical portion 84, which is metallically bonded in end-to-end contact to a transducer 85, which may be of the same construction as transducer 32. The sonotrode 82 and transducer 85 may be and preferably are supported by means of an Elmore mount, described in copending United States patent application Serial No. 517,599, filed June 23, 1955 in the name of William C. Elmore, entitled "Vibratory Device." The Elmore mount comprises a cylindrical metal shell 86, such as a cylindrical steel shell, with the shell 86 having a length of at least a single one-half wave-length according to the metal used at the applied frequency. Shell 86 may have a length equal to a multiple number of one-half wavelengths. In the illustrated embodiment, shell 86 has a length equal to one-half wavelength, and surrounds the cylindrical portion 84 of sonotrode 82 and is concentric therewith and joined thereto at its end 88 by appropriate means, as by welding, brazing or soldering. The other end 90 of shell 86 is free from any attachment, and, accordingly, when the system is vibrating, a true node will develop in the cylindrical shell 86 at the region of the flange 92 one-quarter wavelength distant from free end 90 of shell 86. In the illustrated embodiment, wherein the shell 86 has a length of one-half wavelength, the flange 92 is positioned equally distant from the ends 88 and 90 of shell 86. Flange 92 may be fixedly secured as by rivets, bolting, welding or the like to a support 94 which may be pivoted about fulcrum 95 by applying a force at end 96, permitting the pivotation of the sonotrode 82.

The operation of the embodiment of the present invention shown in Figure 6 is as follows:

The longitudinal axis of the sonotrode 82 is retained approximately parallel or at an angle of from 0° to 30° to the plane of metal sheet 78, and the metal sheet 78 is frictionally engaged with the upper surface of massive reflector anvil 79, the force necessary to maintain the components of the weldment 76 and 78 in firm contact and regulated alignment may be provided by pivoting the transducer-coupler array of Figure 6 about fulcrum 95 and applying at 96 a force 97, utilizing pneumatic, hydraulic, or mechanical equipment diagrammatically illustrated by block 98. Accordingly, a static force will be exerted by the end of the tapered coupling 80 to the components of the weldment 76 and 78 in accordance with the

---

[6] The present invention is applicable to the welding of a true cylinder to other members, provided the cylinder is not welded on its end face; since cylinders disposed other than axially present an arcuate face to the sonotrode and have diminishing cross-sectional area adjacent to the perpendicular to the tangent of the surface undergoing welding.

principle of moments which is well known to engineering. We have found that excellent welds may be achieved even though there is some bending deflection of sonotrode 82. When transducer 85 is functioning, the elastic vibratory excursion of the bulbous portion 81 of sonotrode 82 is in the direction indicated by the double-headed arrow. Welding is effected between strip 76 and sheet 78 due to the substantially lateral vibration of the sonotrode 82 in the aforesaid path, which produces essentially shear vibration in the plane of welding between strip 76 and sheet 78.

In Figure 7 there is a vector analysis on a greatly exaggerated scale at the lower portion of the figure revealing the resultant combined axial-lateral vibratory component designated "F" at any given instant. On a greatly magnified basis, the jaw shapes at different instances are shown by the arcuate lines. Two positions, corresponding to left and right lateral positions of the jaw are shown in the drawing.

The subject invention permits the vibratory welding together of metal members which are difficult, or impossible to adequately retain in operative disposition by means of friction.

The present invention may be embodied in other specific forms without departing from the spirit or essential attributes thereof and, accordingly, reference should be made to the appended claims, rather than to the foregoing specification as indicating the scope of the invention.

We claim:

1. A non-fusion method for welding metal members together comprising placing to-be-welded faces of the metal members together, applying a force to the metal members in a direction and of a magnitude to hold the contacting to-be-welded faces of the metal members in intimate contact at the intended weld zone and to couple mechanical vibratory energy into said zone, substantially positively embracingly contacting at least one of said metal members in more than one plane with a jaw element, and introducing through said jaw element mechanical vibration having a frequency between 59 and 300,000 cycles per second to one of said metal member faces, said mechanical vibration comprising a vibration component in a direction substantially perpendicular to the direction of applied force, and with such component being of an energy level sufficient to weld the metal members to each other.

2. A method in accordance with claim 1 wherein said mechanical vibration is continuous wave vibration.

3. A method in accordance with claim 2 wherein said mechanical vibration has a frequency of between about 400 and 75,000 cycles per second.

4. A method in accordance with claim 2 wherein said applied force is applied through said jaw element.

5. A method in accordance with claim 1 including the step of rotating said jaw element about its longitudinal axis.

6. Apparatus for non-fusion welding contacting metal members together comprising a force-applying member, means for impelling an end portion of said force-applying member against an outer face of one of said contacting metal members with a force in a direction and of a magnitude to hold the to-be-welded faces of the metal members in intimate contact at the intended weld zone and to couple mechanical vibratory energy into the intended weld zone, said end portion of said force-applying member being contoured so that substantially embracing contact in more than one plane occurs between at least one of said metal members and said force-applying member, and means for vibrating said end portion of said force-applying member at a frequency of between 59 and 300,000 cycles per second in a path substantially perpendicular to the direction of the applied force while such to-be-welded faces of the metal members are being held in intimate contact by said end portion of said force-applying member, with said vibrating means furnishing sufficient power so that the mechanical vibration delivered by said end portion in said path is at a sufficient energy level to weld the metal member together.

7. A welding device in accordance with claim 6 in which the vibrating means vibrates the force-applying member at a frequency of between 400 and 75,000 cycles per second.

8. A welding device in accordance with claim 6 in which the longitudinal axis of the force-applying member is substantially parallel to the to-be-welded faces of the metal members.

9. Apparatus in accordance with claim 8 including mechanical means for rotating the force-applying member about said longitudinal axis.

References Cited in the file of this patent

UNITED STATES PATENTS

| 1,000,967 | Farquhar | Aug. 15, 1911 |
| 1,031,812 | Nailler | July 9, 1912 |
| 1,571,412 | Irvin | Feb. 2, 1926 |
| 1,999,805 | Dyer | Apr. 30, 1935 |
| 2,222,906 | Hentzen | Nov. 26, 1940 |
| 2,522,082 | Arnold | Sept. 12, 1950 |
| 2,651,148 | Carwile | Sept. 8, 1953 |
| 2,707,823 | Sowter | May 10, 1955 |
| 2,707,824 | Sowter | May 10, 1955 |
| 2,707,825 | Sowter | May 10, 1955 |
| 2,805,320 | Palic | Sept. 3, 1957 |
| 2,846,563 | Cronin | Aug. 5, 1958 |

FOREIGN PATENTS

| 1,087,439 | France | Aug. 25, 1954 |
| 1,087,440 | France | Aug. 25, 1954 |